US012313267B2

(12) United States Patent
Lee

(10) Patent No.: US 12,313,267 B2
(45) Date of Patent: May 27, 2025

(54) FILM TYPE PLANAR HEATING ELEMENT FOR PREVENTING ELECTROMAGNETIC WAVES

(71) Applicant: IR-Technika Co., LTD., Dongducheon-si (KR)

(72) Inventor: Chungjae Lee, Goyang-si (KR)

( * ) Notice: Subject to any disclaimer, the term of this patent is extended or adjusted under 35 U.S.C. 154(b) by 809 days.

(21) Appl. No.: 17/626,177

(22) PCT Filed: Jul. 10, 2020

(86) PCT No.: PCT/KR2020/009123

§ 371 (c)(1),
(2) Date: Jan. 11, 2022

(87) PCT Pub. No.: WO2021/015470

PCT Pub. Date: Jan. 28, 2021

(65) Prior Publication Data

US 2022/0243927 A1 Aug. 4, 2022

(30) Foreign Application Priority Data

Jul. 25, 2019 (KR) ........................ 10-2019-0090002

(51) Int. Cl.

*F24D 13/02* (2006.01)
*H05B 3/14* (2006.01)
*H05B 3/26* (2006.01)

(52) U.S. Cl.

CPC ........... *F24D 13/024* (2013.01); *H05B 3/145* (2013.01); *H05B 3/267* (2013.01); *H05B 2203/013* (2013.01); *H05B 2203/016* (2013.01)

(58) Field of Classification Search

CPC .. H03K 17/962; H03K 17/955; H05K 9/0071; H05B 3/145; H05B 3/267; H05B 2203/013; H05B 2203/016; F24D 13/024

(Continued)

(56) References Cited

FOREIGN PATENT DOCUMENTS

KR 10-0468651 * 1/2005
KR 10-0468651 B1 1/2005

(Continued)

*Primary Examiner* — Phuong T Nguyen
(74) *Attorney, Agent, or Firm* — KORUS Patent, LLC; Seong Il Jeong

(57) ABSTRACT

A film type planar heating element for preventing electromagnetic waves is configured in a form of multiple layers of films to generate heat, the film type planar heating element comprising: a base film made of synthetic resin and mounted on a floor in a form of sheet film; a carbon heating unit made of carbon materials and arranged in multiple rows to generate heat planarly on a top side of the base film; a pair of center-adjacent copper foil busbars disposed in a center area of the base film, applying current to the carbon heating unit, and facing each other in a close distance so that intensities of electromagnetic waves and magnetic field are mutually canceled each other when the current is applied; a pair of center silver busbars formed between the carbon heating unit and the center-adjacent copper foil busbars and made of silver materials allowing the current, which is applied to the center-adjacent copper foil busbars, to smoothly flow to the carbon heating unit, and a Lamirex film coated on the top side of the base film to protect the carbon heating unit and the center-adjacent copper foil busbars.

3 Claims, 4 Drawing Sheets

(58) Field of Classification Search
USPC ....... 219/202, 209, 211, 213, 488, 489, 490, 219/497, 525
See application file for complete search history.

(56) References Cited

FOREIGN PATENT DOCUMENTS

| | | | | |
|---|---|---|---|---|
| KR | 10-0618162 | | * | 8/2006 |
| KR | 10-0618162 | B1 | | 8/2006 |
| KR | 10-0682571 | | * | 2/2007 |
| KR | 10-0682571 | B1 | | 2/2007 |
| KR | 10-2009-0121720 | A | | 11/2009 |
| KR | 10-1102041 | B1 | | 1/2012 |

* cited by examiner

FILM TYPE PLANAR HEATING ELEMENT FOR PREVENTING ELECTROMAGNETIC WAVES

FIELD OF THE INVENTION

The present invention relates to a film type planar heating element minimizing electromagnetic waves, and more specifically, to a film type planar heating element that can be used safely without concerns regarding electromagnetic waves by arranging center-adjacent copper foil busbars, which apply current to a carbon heating unit in a center area of a base film to generate heat, to face each other in a close distance in the center of the base film; can conveniently generate heat a large area; can significantly improve heating efficiency by allowing the current to be applied from the center to both sides of the carbon heating portion to generate heat; and can prevent sparks generated when the current is applied to ensure safe operation.

BACKGROUND OF THE INVENTION

In general, a film type planar heating element is a typical product of a heating film, which is also called a carbon heating film, a carbon film, a carbon heater, a film heater, and the like.

This film type planar heating element is a floor heating system that combines a Laminex film and a PET film, which is made of insulating materials and flame-retardant materials, printed with electrical conductors such as carbon paste and silver paste, and mounted with copper foil as electrodes. Recently, the film type planar heating element has been popular due to various advantageous effects. That is, this type of heating element emits far-infrared radiation and negative ions by generating heat caused by electrical resistance of carbon, and this far-infrared radiation brings an ideal heating effect. It also has deodorizing and bacterial growth inhibitory effects, and provides a healthy and comfortable heating environment by increasing metabolism of the human body. In addition, the film type planar heating element can be easily constructed and conveniently installed in a large space, so the construction cost is significantly reduced.

However, since electrical conductors of the film type planar heating element, such as carbon paste and copper foil, generate electromagnetic waves which may affect infants and the elderly sensitive to electromagnetic waves, the film type planar heating element is used restrictively. Therefore, research and development are being ongoing to solve these problems.

Recently, various technologies have been developed and released to reduce electromagnetic wave of a film type planar heating element.

As shown in FIG. 5, Korean Patent Registration No. 10-0682571 “Electromagnetic Wave Canceling Planar Heating Element” discloses a film type planar heating element comprising: a plurality of carbon layers 11 provided at appropriate intervals in an insulating film, electrode parts 12*a*, 12*b* supplying power to both ends of the carbon layer 11, and a conductive part disposed in the vicinity of the electrode parts 12*a*, 12*b* and having current which flows in 180° different direction from that in the electrode parts 12*a*, 12*b*, wherein the conductive part includes a first conductive part 110*a* provided in parallel with the (+) electrode part 12*a* to cancel the magnetic field of the (+) electrode part 12*a*, and a second conductive part 110*b* provided in parallel with the (−) electrode part 12*b* to cancel the magnetic field of the (−) electrode part 12*b*.

However, although this conventional planar heating element can cancel the magnetic field generated in the electrode part by using a conductive part through which current flows in a direction 180° different from that of the electrode part at the vicinity of the electrode parts, it still does not free from the influence of electromagnetic waves because the electrode part is installed on both sides of the carbon layer and thus magnetic field and the wavelength of electromagnetic waves are formed in a wide and long range.

DETAILED DESCRIPTION OF THE INVENTION

Technical Problems

The present invention is devised to solve the above problems. The objective of the present invention is to provide a film type planar heating element for preventing electromagnetic waves that can be used safely without concerns regarding electromagnetic waves by arranging center-adjacent copper foil busbars, which apply current to a carbon heating unit in a center area of a base film to generate heat, to face each other in a close distance in the center of the base film; can conveniently generate heat a large area; can significantly improve heating efficiency by allowing the current to be applied from the center to both sides of the carbon heating portion to generate heat; and can prevent sparks generated when current is applied to ensure safe operation.

SUMMARY OF THE INVENTION

To achieve the objects above, a film type planar heating element for preventing electromagnetic waves according to the present invention configured in a form of multiple layers of films to generate heat, the film type planar heating element comprising: a base film made of synthetic resin materials and mounted on a floor in a form of sheet film; a carbon heating unit made of carbon materials and arranged in multiple rows to generate heat planarly on a top side of the base film; a pair of center-adjacent copper foil busbars disposed in a center area of the base film, applying current to the carbon heating unit, and facing each other in a close distance so that intensities of electromagnetic waves and magnetic field are mutually canceled each other when the current is applied; a pair of center silver busbars 40 formed between the carbon heating unit and the center-adjacent copper foil busbars and made of silver materials allowing the current, which is applied to the center-adjacent copper foil busbars, to smoothly flow to the carbon heating unit, and a Lamirex film coated on the top side of the base film to protect the carbon heating unit and the center-adjacent copper foil busbars.

The carbon heating unit comprises: a pair of busbar-carbon adhesion portions which is formed by cutting a center of the carbon heating unit and to which the pair of center-adjacent copper foil busbar is adhered, an adhesion connection portion extending to both sides of the busbar-carbon adhesion portions, a pair of upper connection portions extending upward at outer ends of the adhesion connection portions, and a dual carbon heating unit configured that two of the carbon heating units are interconnected through the upper connection portions.

A surface of a center area of the dual carbon heating unit of the carbon heating unit is coated with an insulating coating portion to be insulated from the center-adjacent copper foil busbar.

A middle-adjacent copper foil busbar is formed between the pair of center-adjacent copper foil busbars in the vicinity of the center-adjacent copper foil busbars so that intensities of electromagnetic waves and magnetic field are mutually canceled each other when the current is applied.

Technical Effects of the Invention

As described above, the effect of the film type planar heating element for preventing electromagnetic waves of the present invention is as follows.

First, the film type planar heating element can be used safely without concerns regarding electromagnetic waves, by arranging center-adjacent copper foil busbars, which apply current to a carbon heating unit in a center area of a base film to generate heat, to face each other in a close distance in the center of the base film.

Second, the film type planar heating element can conveniently heat a large area, by forming a carbon heating unit to be arranged in multiple dual carbon heating units and enabling it to heat planarly on a top side of the base film. In addition, the film type planar heating element can significantly improve heating efficiency, by allowing the current to be applied from the center to both sides of the carbon heating portion to generate heat.

Third, the film type planar heating element can prevent sparks that is generated when current is applied and ensure safe operation, by forming an insulating coating portion coated on a surface of a center area of the dual carbon heating unit.

Fourth, the film type planar heating element can prevent generating electromagnetic waves, by forming a middle-adjacent copper foil busbar between the pair of center-adjacent copper foil busbars in the vicinity of the center-adjacent copper foil busbars, which allows intensities of electromagnetic waves and magnetic field to be canceled when the current is applied.

BEST MODE FOR THE INVENTION

Hereinafter, preferred embodiments of the present invention will be described in detail in conjunction with the accompanying drawings.

Figure 1:
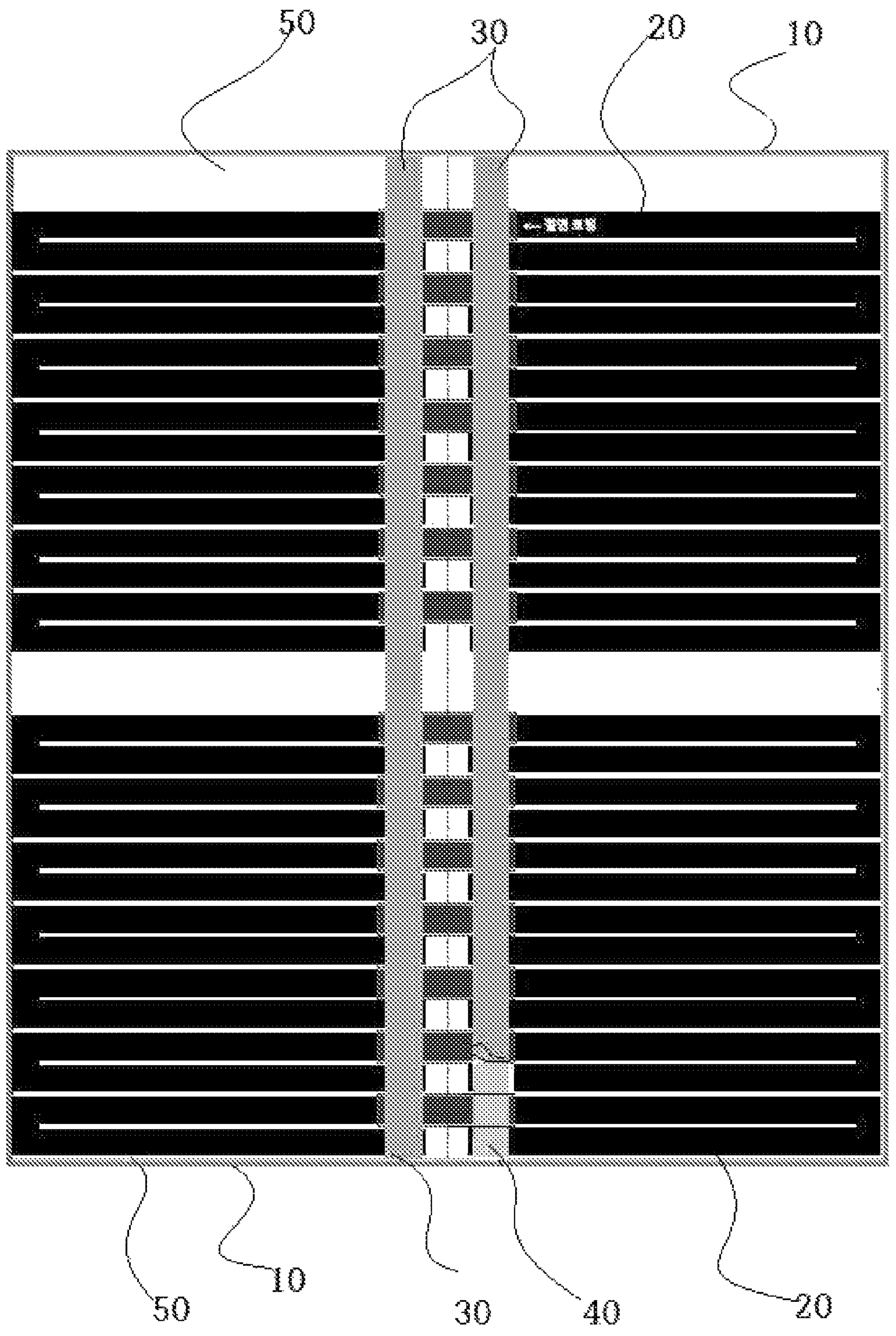
FIG. 1 is a drawing schematically illustrating a film type planar heating element for preventing electromagnetic waves according to the present invention.
Figure 2:
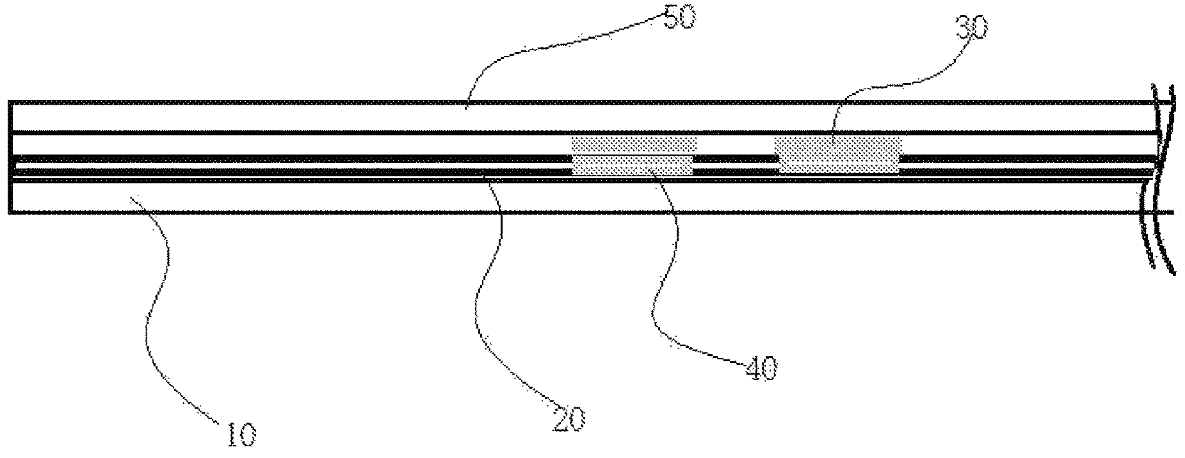
FIG. 2 is a cross-sectional view illustrating a film type planar heating element according to the present invention.

As shown in FIGS. 1 to 2, a film type planar heating element for preventing electromagnetic waves according to the present invention is a film type planar heating element configured in a form of multiple layers of films to generate heat, the film type planar heating element comprising: a base film 10 having a sheet film shape and mounted on a floor; a carbon heating unit 20 made of carbon materials and arranged in multiple rows to generate heat planarly; a pair of center-adjacent copper foil busbars 30 closely disposed to each other and facing each other so that intensities of electromagnetic waves and magnetic field are mutually canceled each other when current is applied; a pair of center silver busbars 40 made of silver materials allowing the applied current to smoothly flow to the carbon heating unit 20, and a Lamirex film 50 coated on a top side of the base film 10.

Figure 3:
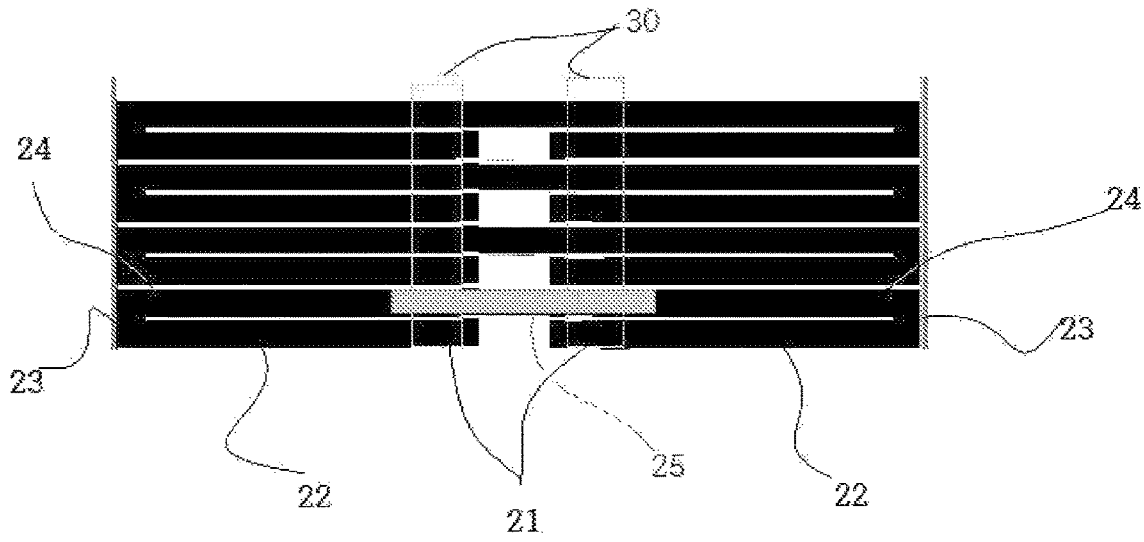
FIG. 3 is a drawing schematically illustrating a carbon heating portion of a film type planar heating element according to the present invention.

In this case, referring to FIG. 3 together, the carbon heating unit 20 is made of carbon materials and arranged in multiple rows to generate heat planarly on the top side of the base film 10. The carbon heating unit 20 comprises a pair of busbar-carbon adhesion portions 21 which is formed by cutting the center of the carbon heating unit 20 and to which the pair of center-adjacent copper foil busbar 30 is adhered, an adhesion connection portion 22 extending to both sides of the busbar-carbon adhesion portions 21, a pair of upper connection portions 23 extending upward at outer ends of the adhesion connection portions 22, and a dual carbon heating unit 24 configured in such a way that two of the carbon heating units 20 are interconnected through the upper connection portions 23.

In addition, it is desired that a surface of a center area of the dual carbon heating unit 24 of the carbon heating unit 20 is coated with an insulating coating portion 25 to be insulated from the center-adjacent copper foil busbar 30.

The pair of center-adjacent copper foil busbars 30 applies current to the carbon heating unit 20 in the center area of the base film 10. The center-adjacent copper foil busbars 30 are closely arranged to each other and face each other so that intensities of electromagnetic waves and magnetic field are mutually canceled each other when the current is applied.

The pair of center silver busbars 40 is formed between the carbon heating unit 20 and the center-adjacent copper foil busbars 30 and made of silver materials so that the current, which is applied to the copper foil busbars 30, can smoothly flow to the carbon heating unit 20.

The Lamirex film 50 is coated on the top side of the base film 10 to protect the carbon heating unit 20, the center-adjacent copper foil busbars 30, and the center silver busbars 40.

Figure 4:
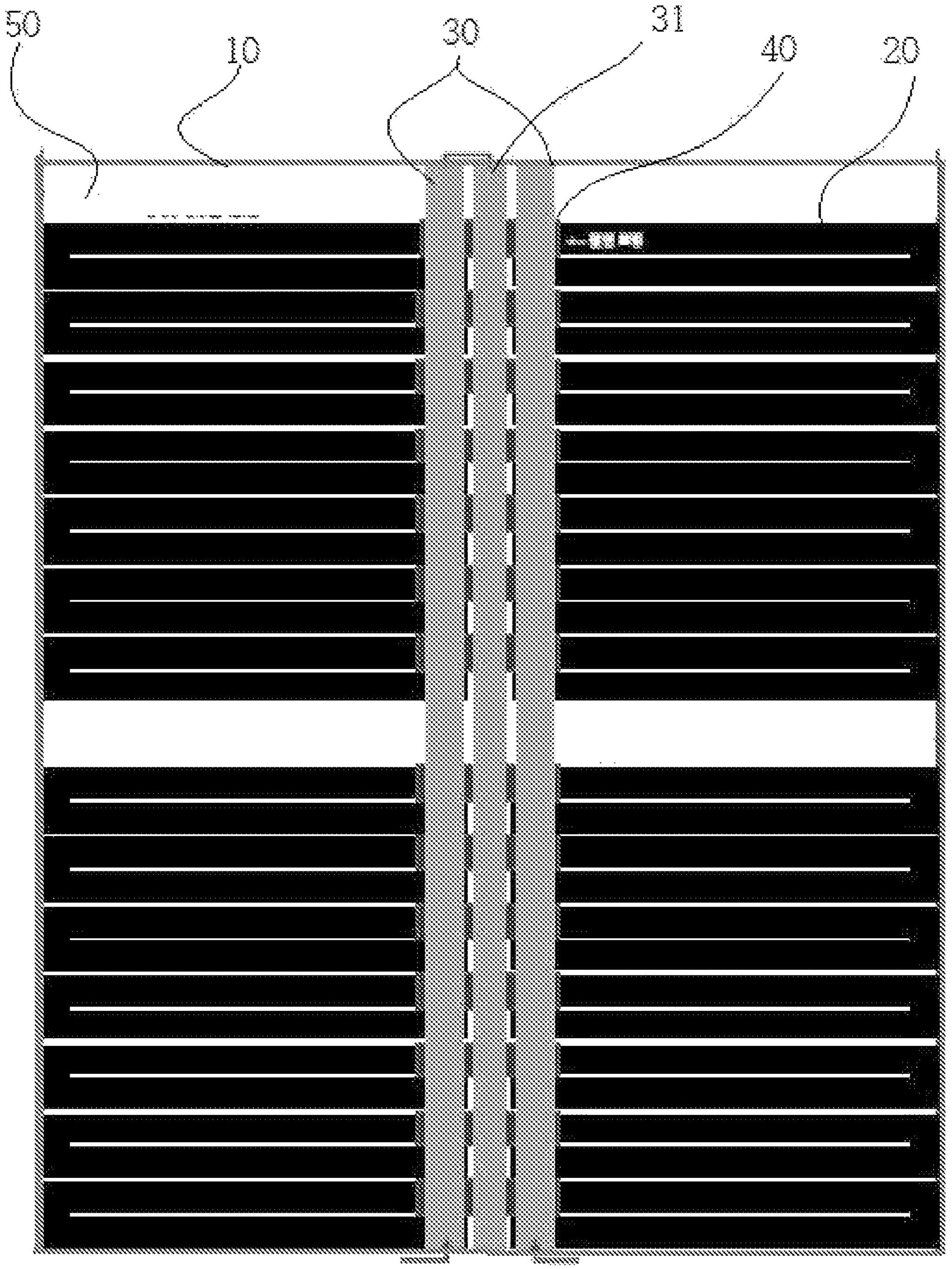
FIG. 4 is a drawing schematically illustrating a copper foil busbar of a film type planar heating element according to the present invention.
Figure 5:
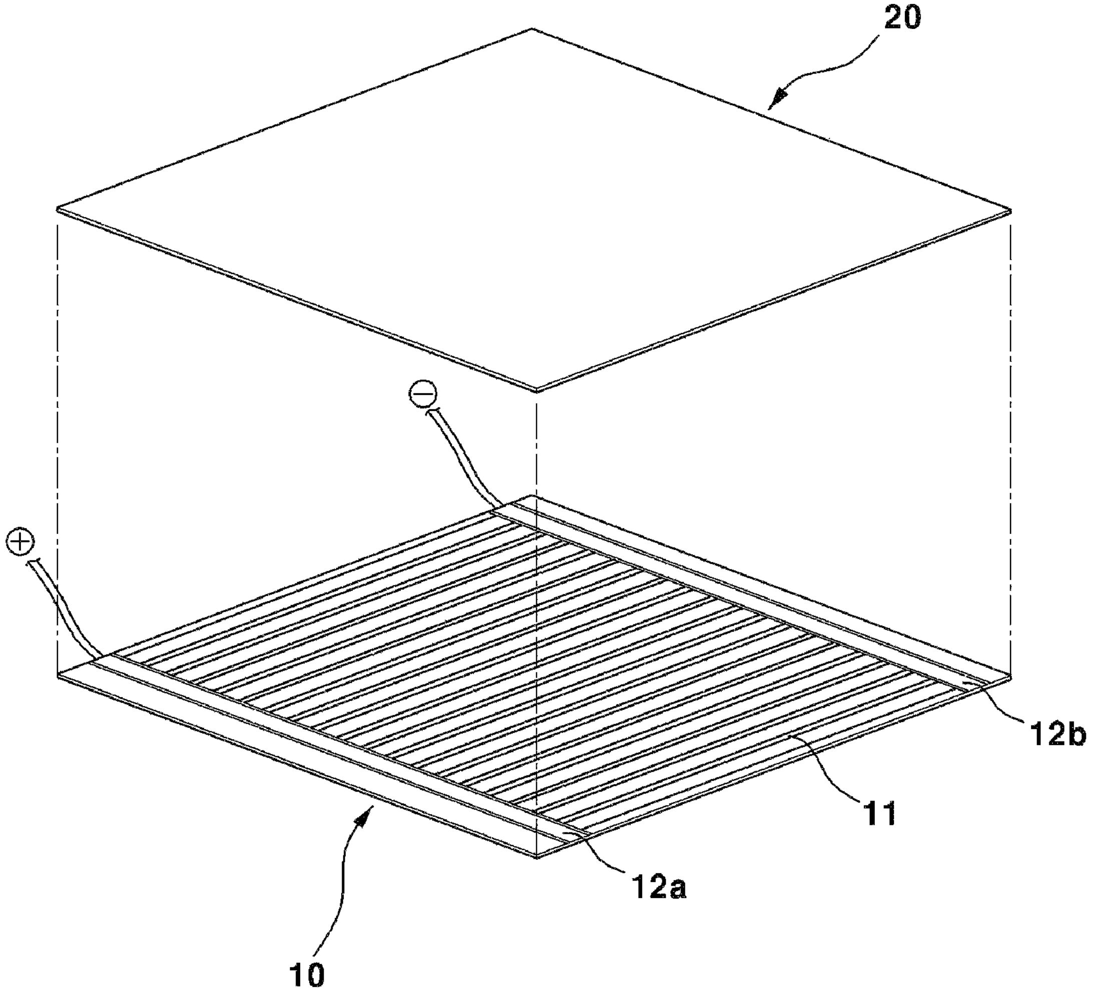
FIG. 5 is a drawing illustrating a conventional film type planar heating element.

Referring to FIG. 4 together, it is desired that a middle-adjacent copper foil busbar 31 is formed between the pair of center-adjacent copper foil busbars 30 in the vicinity of the 30 center-adjacent copper foil busbars 30 to mutually cancel intensities of electromagnetic waves and magnetic field when the current is applied and to connect voltage generated in the pair of center-adjacent copper foil busbars 30 to the ground.

The operation of the film type planar heating element for preventing electromagnetic waves according to the present invention configured as described above is as follows.

As shown in FIGS. 1 to 2, the base film 10 made of synthetic resin materials is formed in a sheet film shape and mounted on a floor, and the carbon heating unit 20 made of carbon materials is arranged in multiple rows to generate heat planarly on the top side of the base film 10. The pair of center-adjacent copper foil busbars 30 is located in a center portion of the carbon heating unit 20, and the center-adjacent copper foil busbars 30 are closely disposed to each other and face each other so that intensities of electromagnetic waves and magnetic field are mutually canceled each other when current is applied. The pair of center silver busbars 40 made of silver materials is coated on the bottom side of the center-adjacent copper foil busbars 30 so that the applied current can smoothly flow to the carbon heating unit 20. The Lamirex film 50 is coated on the top side of the base film 10.

Specifically, as shown in FIG. 3, the carbon heating unit 20 is made of carbon materials and arranged in multiple rows to generate heat planarly on the top side of the base film 10. The carbon heating unit 20 comprises a pair of busbar-carbon adhesion portions 21 which is formed by cutting the center of the carbon heating unit 20 and to which the pair of center-adjacent copper foil busbar 30 is adhered. The adhesion connection portion 22 extends to both sides of the busbar-carbon adhesion portions 21, and the pair of upper connection portions 23 extends upward at the outer ends of the adhesion connection portions 22. The dual carbon heating unit 24 configured to have two of the carbon heating units 20, which are interconnected to each other, is formed between the upper connection portions 23. Accordingly, this configuration of the dual carbon heating unit 24 enables the carbon heating unit 20 to be easily formed in a large area, and significantly improves heating efficiency by allowing the current to be applied from the center to both sides of the carbon heating portion 20 to generate heat.

In addition, the insulating coating portion 25, which is coated on the surface of the center area of the dual carbon heating unit 24 of the carbon heating unit 20 to be insulated from the center-adjacent copper foil busbar 30, prevents sparks that is generated when current is applied, thereby ensuring safe operation.

The pair of center-adjacent copper foil busbars 30 applies current to the carbon heating unit 20 in the center area of the base film 10 to allow the carbon heating unit 20 to generate heat. By arranging the center-adjacent copper foil busbars 30 to face each other in a close distance, intensities of electromagnetic waves and magnetic field can be canceled when the current is applied. Specifically, when the current is applied, multiple currents flow in the vicinity, and thus intensities of electromagnetic waves and magnetic field are mutually canceled each other. Accordingly, the film type planar heating element can be used safely without concerns regarding electromagnetic waves.

The pair of center silver busbars 40 formed between the carbon heating unit 20 and the center-adjacent copper foil busbars 30 and made of silver materials, allows the current, which is applied to the copper foil busbars 30, to smoothly flow to the carbon heating unit 20. Accordingly, the film type planar heating element can be used safely for long periods of time.

As shown in FIG. 4, by forming the middle-adjacent copper foil busbar 31 between the pair of center-adjacent copper foil busbars 30 in the vicinity of the center-adjacent copper foil busbars 30, intensities of electromagnetic waves and magnetic field can be canceled when the current is applied. Specifically, when the current is applied, multiple currents flow in the vicinity, and thus, intensities of electromagnetic waves and magnetic field are mutually canceled each other. Accordingly, the film type planar heating element can prevent generating electromagnetic waves. The middle-adjacent copper foil busbar 31 also can act as a ground by connecting voltage generated in the pair of center-adjacent copper foil busbars 30 to the ground.

The Lamirex film 50 coated on the top side of the base film 10 to protect the carbon heating unit 20, the center-adjacent copper foil busbars 30, and the center silver busbars 40, allows the film type planar heating element to be conveniently used anywhere.

As described above, the preferred embodiments of the present invention have been described; however, any modifications, which can be embodied by combining conventional techniques with the embodiments or which can be easily changed from the embodiments by one skilled in the art to which the present invention belongs, based on the appended claims and detailed description of the present invention, will be considered to be included in the technical scope of the present invention.

What is claimed is:

1. A film type planar heating element for preventing electromagnetic waves configured in a form of multiple layers of films to generate heat, the film type planar heating element comprising:

a base film made of synthetic resin materials and mounted on a floor in a form of sheet film;

a carbon heating unit made of carbon materials and arranged in multiple rows to generate heat planarly on a top side of the base film;

a pair of center-adjacent copper foil busbars disposed in a center area of the base film, applying current to the carbon heating unit, and facing each other in a close distance so that intensities of electromagnetic waves and magnetic field are mutually canceled each other when the current is applied;

a pair of center silver busbars formed between the carbon heating unit and the center-adjacent copper foil busbars and made of silver materials allowing the current, which is applied to the center-adjacent copper foil busbars, to smoothly flow to the carbon heating unit, and a Lamirex film coated on the top side of the base film to protect the carbon heating unit and the center-adjacent copper foil busbars, wherein the carbon heating unit comprises:

a pair of busbar-carbon adhesion portions which is formed by cutting a center of the carbon heating unit and to which the pair of center-adjacent copper foil busbar is adhered, an adhesion connection portion extending to both sides of the busbar-carbon adhesion portions, a pair of upper connection portions extending upward at outer ends of the adhesion connection portions, and a dual carbon heating unit configured that two of the carbon heating units are interconnected through the upper connection portions.

2. The film type planar heating element of claim 1, wherein a surface of a center area of the dual carbon heating unit of the carbon heating unit is coated with an insulating coating portion to be insulated from the center-adjacent copper foil busbar.

3. The film type planar heating element of claim 2, wherein a middle-adjacent copper foil busbar is formed between the pair of center-adjacent copper foil busbars in the vicinity of the center-adjacent copper foil busbars so that intensities of electromagnetic waves and magnetic field are mutually canceled each other when the current is applied.

* * * * *